United States Patent Office 3,275,124
Patented Sept. 27, 1966

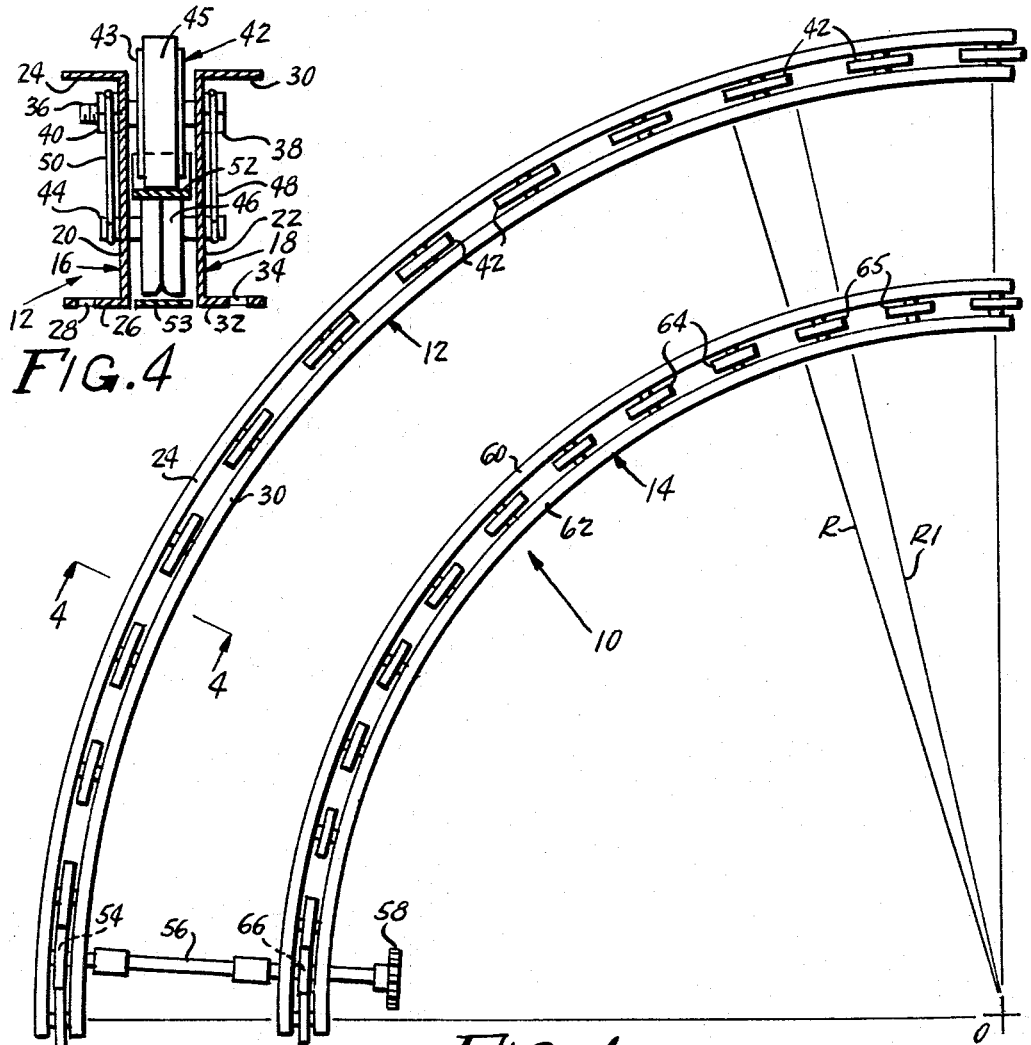
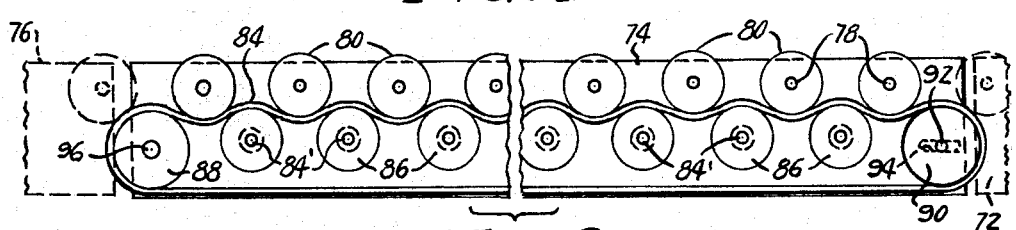
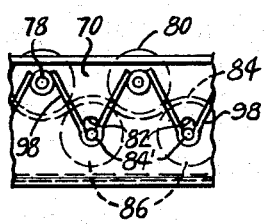

3,275,124
BELT DRIVEN LIVE ROLLER CONVEYOR
Harry L. Lutes, Centerville, and Robert J. Smith, Dayton, Ohio, assignors to Kornylak Corporation, Hamilton, Ohio, a corporation of New Jersey
Filed Oct. 22, 1964, Ser. No. 405,702
8 Claims. (Cl. 198—127)

This invention relates to a belt driven live roller conveyor and more particularly to a rollerway wherein the rollers are belt driven.

An object of this invention is the provision of a rollerway having intermediate rollers below the load carrying rollers and in which a belt operates to transmit torque to all of the rollers.

Another object of this invention is the provisions of means to apply pressure to the belt and the line rollers by means of the intermediate rollers.

A further object of this invention is the provision of improved means for driving the rollers of a rollerway which includes an arcuate portion.

Roller conveyors operating on an arc of a circle, or other appropriate arc, generally employ tapered or cone-shaped rollers. Several means of driving such rollers are known, including intermeshing gears at one end of each cone-shaped roller. However, due to the different surface speeds at different distances along the surface of a rotating cone, considerable friction develops between the roller and a load travelling thereover. This results in waste due to heat and wear. Our invention largely overcomes the disadvantages of the former system. The conveyor of this invention includes a pair of parallel rollerways on the arc of a circle having live belt driven rollers in each rollerway.

It is therefore an additional object of this invention to provide a roller conveyor including a pair of parallel arcuate rollerways, each having belt driven live rollers and spring pressed intermediate rollers pressing the belt against the live rollers.

The above and other objects will become apparent from a consideration of the following specification taken with the accompanying drawings which together form a complete disclosure of our invention.

In the drawings:

FIG. 1 is a plan view of an arcuate roller conveyor having parallel rollerways;

FIG. 2 is an elevation, with parts omitted, of a series of sections of a straight rollerway;

FIG. 3 is a fragmentary elevation of a rollerway showing the spring tensions means; and FIG. 4 is a section substantially on the line 4—4 of FIG. 1.

FIG. 1 illustrates our invention as applied to a roller conveyor 10 having two parallel rollerways 12 and 14 spaced apart any suitable distance, and formed into a 90° arc. Supporting frames are not shown as they may be conventional and form no part of the present invention.

The rollerway 12 consists of a pair of similar channel members 16 and 18 allochirally arranged with bases 20 and 22 facing one another, and spaced by means of suitable means, not shown. The channel 16 has flanges 24 and 26, flange 26 having perforations 28 at suitable intervals for attachment thereof to a suitable frame or other support. Channel 18 has flanges 30 and 32. Flange 32 has perforations 34 at suitable intervals for attachment thereof to a frame or other suitable support.

The channel bases 20 and 22 have suitable openings spaced longitudinally thereof to receive bolts having heads 38 and are provided with nuts 40. The bolts 36 comprise axes for the rollers 42. Other openings support below and intermediate the pins 30. Pins 44 carry idler rollers 46. The bolt heads 38 and one end of each pin 44 are grooved circumferentially, not shown, to accommodate springs 48 which engage under a pin 44 and over the heads 38. Nuts 40 and the other end of each pin 44 are grooved in the same manner to accommodate springs 50 in a like manner. The openings through which pins 44 pass are oversize as set forth for the openings 18 in the application of Harry L. Lutes, Serial No. 383,664, filed July 20, 1964, and assigned to the assignee of this application.

An endless belt 52 passes under each roller 42 and over each idler roller 46. The return flight 53 of the belt 52 rides between the channels 16 and 18 and may be supported by suitable idler rollers in known manner. The belt 52 is preferably cut on an arc having its longitudinal center on a radius passing diametrically through the rollers 42. Power is applied to the belt 52 by means of a pulley 54 mounted on a shaft 56 which passes through rollerways 12 and 14 and has a sprocket 58 or other means of connecting same to a source of power.

The rollers 42 have hub portions 43 and tires 45. In view of the fact that these rollers are normally about 2¼ inches in diameter and the tires are about ½ inch wide, and are formed of tough elastomeric material, it is not considered necessary to taper them. The rollers 64 will, of course, have a smaller diameter, depending on the distance between the rollerways 12 and 14. They will otherwise be like the rollers 42. The relative diameters of the pulleys 54 and 66 are determined in the same manner as those of the rollers 42 and 64. This will insure that the relative speeds of rotation of the rollers 42 and 64 are such that articles travelling over the rollerways 12 and 14 will assume the proper curved path of travel and remain on the conveyor.

Rollerway 14 is like rollerway 12 in all respects except its dimensions. The channels 60 and 62 are like channels 16 and 18 except that they are bent on a shorter radius and are parallel to channels 16, 18. The rollers 64 are of smaller diameter than the rollers 42 as clearly shown by the radii R and R' extending from the point O which is the center of curvature of the rollerways 12 and 14. A belt, similar to the belt 52 will pass about the pulley 66 and engage the rollers 64 and the intermediate rollers, not shown. In view of the above, further description of rollerway 14 is deemed unnecessary.

The principles of this invention may be applied with equal facility to a straight rollerway as shown in FIG. 2. In this figure, the channel 70 nearest the viewer is omitted, for clarity. The channels 72, 74 and 76 are connected in any desired manner to form a rollerway of the desired length. Each channel, as 74, is provided with a longitudinal series of openings to accommodate axle pins 78 for the rollers 80. Below and intermediate the openings 80 are enlarged openings 82 for the axle pins 84 of the idler rollers 86. A belt 84 is trained about pulley 88 and take-up pulley 90 mounted on the axle pin 92 which rides in an elongated slot 94 and is suitably urged to the right, in FIG. 2, in any well known manner. The pulley 88 is mounted on an axle pin 96, which may be extended and provided with means to connect same to a source of power. The idler rollers 86 are spring urged toward the belt 84 by means of springs 98 in much the same manner as the rollers 46 are urged toward the belt 52 by the springs 48 and 50. This spring loading means is the same as that shown in the application of Lutes, above mentioned.

While the arrangement of the Lutes application above mentioned is adequate and satisfactory for short sections of rollerway, the drive means of this application is better for longer sections and heavier loads.

Having described our invention in a preferred embodiment, we desire it to be understood that various modifications and changes may be made within the skill of the art and within the scope of the appended claims.

We claim:

1. In a power driven roller conveyor, two parallel rollerways, each formed on the arc of a circle, and wherein each rollerway comprises a pair of spaced apart channels having their bases facing one another, rollers longitudinally spaced mounted between the channels and projecting slightly above the channels, idler rollers located between the channels below and intermediate the first mentioned rollers, and wherein each roller is substantially a section of a cone parallel to its base, and the vertex of which is the center of curvature of the rollerway belt means for driving the rollers, means urging the idler rollers toward the other rollers and the belt means, and means for moving the belt means.

2. The structure as defined in claim 1 wherein the belt means is an endless belt which engages between the idler rollers and the other rollers, and including a drive pulley in a bight of the belt, said pulley having means for connecting same to a source of power, a take-up pulley located in another bight of the belt.

3. The structure as defined in claim 1 wherein the diameters of rollers of the outermost rollerway are the bases of the cones.

4. The structure as defined in claim 1 wherein the belt means which drives the rollers of each rollerway in an endless belt cut on an arc having the same radius as that of the rollerway.

5. In a power driven conveyor, a pair of spaced apart parallel arcuate rollerways, upwardly facing conveyor rollers in each rollerway, idler rollers below and intermediate and below the conveyor rollers, an endless belt engaging the conveyor rollers and idler rollers of each rollerway, each belt having a transverse arcuate configuration of the same radius of curvature as that of the cooperating rollerway.

6. The structure as defined in claim 5 including means urging the idler rollers toward the belt and the conveyor rollers.

7. The structure as defined in claim 6 in which the means urging the idler rollers toward the conveyor rollers comprises springs.

8. The structure as defined in claim 5 wherein the return flight of the belt passes above a power driven pulley.

References Cited by the Examiner

UNITED STATES PATENTS

| 1,975,927 | 10/1934 | Cushman | 198—127 |
| 3,180,480 | 4/1965 | Preston | 198—127 |

FOREIGN PATENTS

| 277,840 | 2/1927 | Great Britain. |

EVON C. BLUNK, *Primary Examiner.*

R. E. KRISHER, *Assistant Examiner.*